United States Patent [19]

Jacobson

[11] Patent Number: 4,460,655
[45] Date of Patent: Jul. 17, 1984

[54] TIO₂ PIGMENT BEARING A COATING WITH FLUORIDE IONS AND LAMINATE AND COATING BASED THEREON

[75] Inventor: Howard W. Jacobson, Wilmington, Del.

[73] Assignee: E. I. Du Pont de Nemours and Company, Wilmington, Del.

[21] Appl. No.: 481,926

[22] Filed: Apr. 4, 1983

[51] Int. Cl.³ .................. B32B 27/42; C09C 1/62; C09C 3/00
[52] U.S. Cl. .................. 428/530; 106/300; 106/308 B; 106/309; 428/328; 428/342
[58] Field of Search .............. 106/308 B, 309, 300; 524/593; 428/328, 342, 530

[56] References Cited

U.S. PATENT DOCUMENTS

| | | | |
|---|---|---|---|
| 3,385,718 | 5/1968 | Hafford et al. | 106/308 B |
| 3,513,007 | 5/1970 | Lederer | 106/308 B |
| 3,804,655 | 4/1974 | Hinley et al. | 106/308 B |
| 4,239,548 | 12/1980 | Barnard et al. | 106/300 |

FOREIGN PATENT DOCUMENTS 2115394 12/1982 United Kingdom.

Primary Examiner—H. S. Cockeram

[57] ABSTRACT

A pigment of TiO₂ particles coated with alumina and having associated therewith fluoride ions or fluoride compounds, can be used to prepare paper laminates having a high degree of lightfastness.

6 Claims, No Drawings

# TiO₂ PIGMENT BEARING A COATING WITH FLUORIDE IONS AND LAMINATE AND COATING BASED THEREON

DESCRIPTION

1. Technical Field

This invention relates to pigment composed of coated $TiO_2$ particles. More particularly, it relates to a pigment of $TiO_2$ particles coated with alumina or alumina-silica and having a fluoride compound or fluoride ions associated with them.

2. Background and Summary of the Invention

Paper laminates are products widely used in the construction industry for making counter tops and the like. The laminates are ordinarily composed of paper impregnated with $TiO_2$ pigment and imbedded in a polymer matrix. Such laminates have an unfortunate tendency to discolor on exposure to ultraviolet light, and this detracts from their value because in many uses they are exposed to such radiation.

The pigment of the present invention is highly resistant to discoloration on exposure to ultraviolet light, and, when used in making a paper laminate, gives a product with significantly better lightfastness than one using conventional $TiO_2$ pigment.

The pigment of the invention is composed of rutile $TiO_2$ particles conventionally coated with alumina or with alumina-silica. The coating ordinarily constitutes 1–8%, preferably 3–5%, by weight, of the pigment. Associated with the particles is a fluoride compound at a concentration of 0.05–5%, by weight of the $TiO_2$, or fluoride ions at a concentration of 0.05–2, by weight of the $TiO_2$, preferably 0.2–0.6%. "Associated with the particles" means that some of the fluoride compounds or fluoride ions are adsorbed on the $TiO_2$ particle surfaces, and that some are contained within the coatings themselves.

Fluoride ion content and fluoride compound content of the pigment may be determined as follows:

(a) Slurry 200 g of the pigment to be analyzed in 200 ml of distilled and doubly deionized water.

(b) Adjust the pH of the slurry to 10.0 with 50% aqueous sodium hydroxide.

(c) Stir the slurry for 24 hours in a closed vessel.

(d) Filter and analyze the filtrate by ion chromatography for the amount present, expressed as percent of the pigment weight.

The pigment of the invention which has fluoride ions associated with it is also cerium ion-free, which means that the pigment is either completely devoid of cerium ions or contains only a small and insignificant number.

Fluoride compounds which can be associated with the pigment particles according to the invention are $K_7Ce_6F_{31}$ $Na_7Ce_6F_{31}$ $Li_7Ce_6F_{31}$ and $(NH_4)_7Ce_6F_{31}$.

$(NH_4)_7Ce_6F_{31}$ is preferred.

The $TiO_2$ used to prepare the pigment of the invention can be of the conventional rutile variety, prepared by either the chloride or the sulfate process.

A pigment of the invention which has fluoride ions associated with its particles may be made by first preparing an aqueous slurry containing 200–400 grams per liter of $TiO_2$. This slurry is brought to 45°–70° C. and is held there during the rest of the preparation procedure. To the slurry is then added, with stirring, enough of a water-soluble fluoride to give a fluoride ion concentration in the slurry of 0.5–2%, by weight of the $TiO_2$. Illustrative of fluorides which can be used to supply fluoride ion are NaF, KF, $NH_4F$ and LiF. NaF is preferred. The slurry is then ordinarily stirred for 1–15 minutes.

Alumina is then precipitated on the $TiO_2$ particles by adding enough sodium aluminate to the slurry to give a concentration of 1–8%, by weight of the $TiO_2$. Acid, ordinarily sulfuric acid or hydrochloric acid, is added at the same time, to maintain the pH of the slurry within the range 6.5–9 during the precipitation step. After addition of the aluminate is complete, the slurry is allowed to cure, with stirring, for 15–30 minutes.

The resulting pigment is then separated from the liquid by filtration or centrifugation, is washed with water and then dried. However the pigment of this aspect of invention is prepared, one should take care to avoid the addition of cerium ions at every stage of preparation.

The pigment of the invention which has a fluoride compound associated with its particles may be prepared in a similar way, by first preparing an aqueous slurry of $TiO_2$ and then generating the fluoride compound in it in situ. This is done according to the illustrative equation

$$31NaF + 6Ce(SO_4)_2 \rightarrow Na_7Ce_6F_{31} + 12Na_2SO_4$$

Illustrative of cerium salts which may be used are ammonium ceric nitrate, ceric nitrate, and ceric sulfate. Ceric sulfate is preferred.

The amounts of an appropriate cerium salt and a fluoride, required to give the desired concentration of fluoride compound in the pigment, are added to the slurry in ratios dictated by the stoichiometry of the eqation. The slurry is then processed as previously described.

The resulting pigments of the invention may be used to prepare paper laminates in any of the customary ways, typically by mixing the pigment with paper pulp and then making paper of it in the usual way, impregnating this paper with a resin, ordinarily a melamine-formaldehyde or urea-formaldehyde resin, and then curing the mixture with heat. These procedures are set forth in greater detail in U.S. Pat. No. 4,239,548, which is incorporated into this specification to show such procedures.

Coating compositions may be prepared with the pigments of the invention in any of the conventional ways, by blending the pigment with a film-forming component and a liquid carrier.

EXAMPLES

In the following examples, all parts are by weight.

EXAMPLE 1

Three thousand parts of rutile $TiO_2$ were dispersed in 7500 parts of distilled water, to give a slurry with a pH of 3.8. The slurry was then heated to and held at 50° C. and to it were then added, with stirring, 30 parts of sodium fluoride. The slurry was then stirred for ten minutes at 50° C., at which point the slurry had a pH of 9.3.

To the slurry were then added, over a 30-minute period and with stirring at 50° C., 343 parts of an aqueous solution of sodium aluminate (containing an equivalent of 350 parts of $Al_2O_3$ per 1000 parts of water). During this addition, the pH of the slurry was held at about 7.5 by adding concentrated sulfuric acid.

When the addition of sodium aluminate was complete, the slurry was stirred for 30 minutes at 50° C. The $TiO_2$ was then filtered off, washed with water, dried and micronized.

The resulting pigment had fluoride ions associated with it.

EXAMPLE 2

Three thousand parts of rutile $TiO_2$ were dispersed in 7500 parts of distilled water, to give a slurry with a pH of 3.85. The slurry was then heated to and held at 50° C., and to it were then added, with stirring, 30 parts of sodium fluoride. The slurry at this point had a pH of 9.1.

To the slurry were then added, over a 5-minute period and with stirring at 50° C., 140 parts of a solution of 85.5 parts of ceric sulfate in 1000 parts of water. At this point the slurry had a pH of 2.7.

343 Parts of an aqueous solution of sodium aluminate (containing an equivalent of 350 parts of $Al_2O_3$ per 1000 parts of water) were then added to the slurry over a 30 minute period, with stirring at 50° C. During this addition, the pH of the slurry was held at about 7.5 by adding concentrated sulfuric acid.

When the addition of the sodium aluminate was complete, the slurry was stirred for 30 minutes at 50° C. The $TiO_2$ was then filtered off, washed with water, dried and micronized.

The resulting pigment had $Na_7Ce_6F_{31}$ associated with it.

EXAMPLE 3

Three thousand parts of rutile $TiO_2$ were dispersed in 7500 parts of distilled water, to give a slurry with a pH of 3.8. The slurry was then heated to and held at 50° C., and to it were added, over a 5-minute period, 175 parts of a solution of 85.5 parts of ceric sulfate in 1000 parts of water. The slurry at this point had a pH of 1.65.

Thirty parts of ammonium bifluoride were then added to the slurry, with stirring, at 50° C. The slurry was then held at 50° C., with stirring, for 10 minutes.

343 Parts of an aqueous solution of sodium aluminate (containing an equivalent of 350 parts of $Al_2O_3$ per 1000 parts of water) were then added to the slurry over a 30-minute period, with stirring at 50° C. During this addition, the pH of the slurry was held at about 7.5 by adding concentrated sulfuric acid.

When addition of the sodium aluminate was complete, the slurry was stirred for 30 minutes at 50° C. The $TiO_2$ was then filtered off, washed with water, dried and micronized.

The resulting pigment had $(NH_4)_7Ce_6F_{31}$ associated with it.

I claim:

1. A cerium ion-free pigment of rutile $TiO_2$ particles bearing coatings which comprise alumina, the pigment having associated therewith 0.05–2%, by weight of the $TiO_2$, of fluoride ions.

2. A pigment of rutile $TiO_2$ particles bearing coatings which comprise alumina, the pigment having associated therewith 0.05–5%, by weight of the $TiO_2$, of $Na_7Ce_6F_{31}$ $K_7Ce_6F_{31}$ $Li_7Ce_6F_{31}$ or $(NH_4)_7Ce_6F_{31}$.

3. A paper laminate comprising paper and a pigment according to claim 1 in a rigid matrix.

4. A paper laminate comprising paper and a pigment according to claim 2 in a rigid matrix.

5. A coating composition comprising
   (a) pigment according to claim 1,
   (b) a film-forming material, and
   (c) a liquid carrier.

6. A coating composition comprising
   (a) pigment according to claim 2,
   (b) a film-forming material, and,
   (c) a liquid carrier.

* * * * *